United States Patent
Roberts

(10) Patent No.: US 8,611,989 B2
(45) Date of Patent: Dec. 17, 2013

(54) MULTI-PLANAR RECONSTRUCTION LUMEN IMAGING METHOD AND APPARATUS

(75) Inventor: Colin Roberts, Edinburgh (GB)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 265 days.

(21) Appl. No.: 12/956,757

(22) Filed: Nov. 30, 2010

(65) Prior Publication Data

US 2012/0136236 A1    May 31, 2012

(51) Int. Cl.
*A61B 5/00*    (2006.01)

(52) U.S. Cl.
USPC ........... 600/431; 600/433; 600/407; 600/410; 600/420; 600/425

(58) Field of Classification Search
None
See application file for complete search history.

(56) References Cited

U.S. PATENT DOCUMENTS

| | | | |
|---|---|---|---|
| 7,620,224 B2 * | 11/2009 | Matsumoto | 382/128 |
| 2004/0202990 A1 * | 10/2004 | Geiger | 434/262 |
| 2006/0286037 A1 * | 12/2006 | Hirano et al. | 424/9.41 |
| 2007/0109294 A1 * | 5/2007 | Gotman et al. | 345/418 |
| 2010/0082692 A1 | 4/2010 | Akinyemi et al. | |

FOREIGN PATENT DOCUMENTS

WO    WO 2009/066053 A2    5/2009

OTHER PUBLICATIONS

W. Gerald Austen, M.D., et al., "A Reporting System on Patients Evaluated for Coronary Artery Disease", Circulation, American Heart Association Committee Report, vol. 51, Jan. to Jun. 1975, 37 pages.

Michiel Schaap, et al., "Standardized Evaluation Methodology and Reference Database for Evaluating Coronary Artery Centerline Extraction Algorithms", Medical Image Analysis, vol. 13, 2009, pp. 701-714.

George M. Vetrovec, M.D., "Coronary Anatomy, Variants and Lesion Characteristics", The Society for Cardiovascular Angiography and Interventions (http://www.scai.org/Education/Slides.aspx), Medical College of Virginia Campus Virginia Commonwealth University, Jan. 2003, 21 pages.

* cited by examiner

*Primary Examiner* — Unsu Jung
*Assistant Examiner* — Amanda Lauritzen Moher
(74) *Attorney, Agent, or Firm* — Oblon, Spivak, McClelland, Maier & Neustadt, L.L.P.

(57) ABSTRACT

A method of generating an image of a segment of a lumen structure comprises acquiring volumetric image data that comprises image data representative of a longitudinal segment of a lumen structure, extracting the segment of lumen structure from the volumetric image, calculating a thickness of planar MPR slab that at least encompasses the longitudinal segment of lumen structure, and rendering a planar MPR slab image based on the thickness and the volumetric image data.

22 Claims, 8 Drawing Sheets

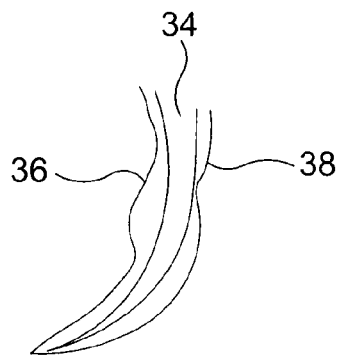
Fig 3
Fig 4
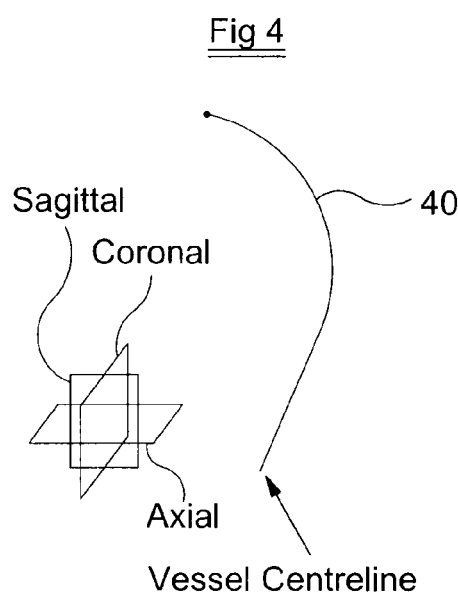
Sagittal
Coronal
Axial
Vessel Centreline
Fig 5
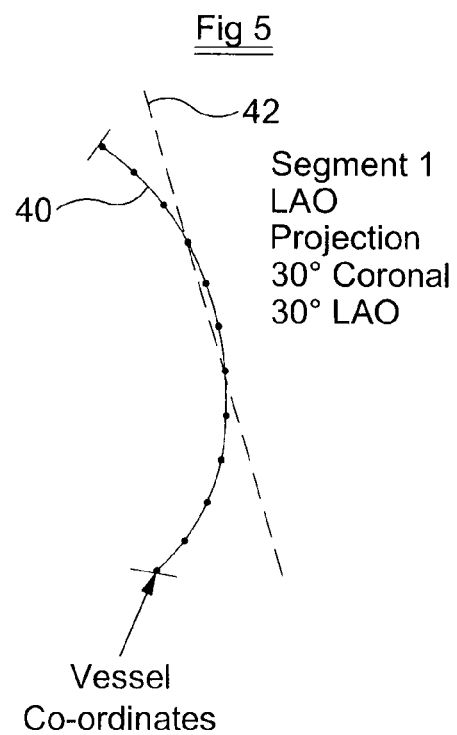
Segment 1
LAO
Projection
30° Coronal
30° LAO
Vessel Co-ordinates Max distance of point from optimal = 10mm Switching between these planes achieved automatically when user scrolls past centreline point Ⓐ

MULTI-PLANAR RECONSTRUCTION LUMEN IMAGING METHOD AND APPARATUS

FIELD

Embodiments described herein relate generally to imaging methods and apparatus, for example imaging methods and apparatus for imaging lumen structures. The imaging methods and apparatus may be used for imaging selected segments of the coronary artery structure, for example to provide cross-sectional views of the segments of the coronary artery that may be used to determine the presence of stenoses or other abnormalities.

BACKGROUND

Catheter based angiography is a medical imaging modality offering planar viewing of contrast enhanced blood vessels and other structures within the human or animal body. For many applications it is the standard technique used for vascular imaging and as a result there is a large scale standardization of the standard viewing planes for particular anatomical structures. The standardisation of viewing planes is however a guide and the use of such standard viewing planes may not achieve the ideal representation of a three dimensional anatomical structure using a two dimensional plane.

Catheter based angiography can be used to image a segment of an anatomical structure for subsequent use in assessment of any abnormalities that may be present, for example determining whether a stenosis is present in a segment of a coronary artery. The technique can also be used as part of a medical treatment being performed on a patient, for example it can be used to image a coronary artery whilst a stent is being inserted into the coronary artery.

Standard catheter based angiography techniques use a C-arm X-ray imaging apparatus, in which an X-ray source and detector are positioned at opposite sides of a patient's body. A catheter is inserted to a region of interest and contrast agent is injected. The X-ray source and detector can be positioned at any orientation with respect to the patient's body to provide a two-dimensional planar image at any desired orientation. Blood vessels in which the contrast agent is present can be seen clearly on the resulting image.

Catheter based angiography is widely used for viewing of coronary artery structures. In particular, catheter based angiography is widely used to detect the presence of stenoses (abnormal narrowings) in coronary artery structures. In order to detect the presence of a stenosis in a particular coronary artery structure planar images at various orientations, including at least two orthogonal orientations, are obtained and the resulting planar images are viewed by a radiologist or cardiologist who is trained to detect the presence of stenoses or other abnormalities from the images.

The coronary arteries make up a complex tree-like structure, which can be segmented into different longitudinal segments according to standard models, for example the AHA (American Heart Association) 15 segment model or the modified AHA 17 segment model. Viewing planes for the viewing of different segments of a normal coronary artery structure using catheter based angiography have become standardised and there are standard viewing planes for each of the segments.

For each segment, catheter based angiography measurements are performed for the standard set of orientations of the X-ray source and detector for that segment to obtain images for each of the standardised viewing planes. Typically for each vessel, measurements at 6 or 7 different orientations may be obtained. A radiologist or cardiologist is trained to detect the presence of stenoses or other abnormalities based upon these standard viewing planes.

Human anatomy varies from patient to patient and the standard viewing planes for coronary catheter-based angiography represent the best viewing planes for the average patient, and do not take into account individual variation between patients. For some patients, the cardiac artery anatomy will differ significantly from the average, and a radiologist or cardiologist may instruct further catheter based angiography measurements to be performed at different orientations, after viewing images obtained for the standard viewing planes. Significant amounts of time can be wasted in adjusting views to obtain an optimum viewing plane for each patient.

Given the number of different segments of the coronary artery structure, the number of separate catheter based angiography measurements required for each segment, and the possibility of having to repeat measurements at different orientations for some patients, catheter based angiography for the study of coronary artery structures can require a large number of separate measurements, which can be time-consuming and expensive. Furthermore, as catheter based angiography is an invasive procedure it can cause complications in some patients. In addition, catheter based angiography can be used only to obtain information on the lumen of the coronary artery or other blood vessel, it cannot generally be used to detect the thickening of the vessel wall.

Modern three-dimensional imaging techniques including computerised tomography (CT), magnetic resonance imaging (MRI) and volumetric (cone-beam) angiography, have the ability to produce volumetric representations of anatomy allowing users to examine acquired data retrospectively or under live screening from any plane and apply image processing techniques to achieve accurate viewing of individual structures. CT and MRI measurements are generally quicker and cheaper to perform than traditional catheter based angiography measurements, and can also be used to determine the thickness and other properties of vessel walls as well as the path and thickness of the vessels themselves.

Such three-dimensional techniques produce large three-dimensional volume data sets comprising a three-dimensional array of voxels each representing a property of a corresponding measurement volume. In the case of CT data sets, each voxel usually represents the attenuation of X-ray radiation by a respective, corresponding measurement volume.

Many techniques have been developed for selecting, processing and visualising data obtained used three-dimensional imaging techniques. For example, multi-planar reconstruction (MPR) techniques can be used to select and visualise two dimensional planes from the three dimensional data set. A plane is selected within the three dimensional volume and data from that plane only are displayed. Slab (or thickened) MPR is a variant of the technique in which the MPR plane has a selected thickness of greater than one voxel and data only from the thickened plane are displayed. Various rendering techniques determining how the MPR data are rendered on a display are also know, for example maximum intensity projection (MIP) or direct volume rendering (DVR).

In the case of coronary artery imaging using three-dimensional imaging techniques, there are currently two main recognised methods of investigating the coronary arteries in cross sectional imaging, based on three dimensional data sets obtained from coronary computed tomography angiogram (CCTA) measurements or cardiac magnetic resonance imaging (CMR) measurements.

The two methods take different approaches to the difficulties of representing portions of the curved, complex coronary artery structure in two dimensional images.

In the first method (also referred to as the traditional approach) planar two-dimensional images are obtained from slab (thickened) MPR of a selected segment of the coronary artery structure, and are used to examine the segment of the coronary artery along its length. Usually, the segment of coronary artery to be viewed, and the orientation and thickness of the MPR plane, are selected manually by an operator using a suite of imaging and rendering tools.

Such planar MPR techniques are generally trusted by users but each planar MPR image can only provide a partial view of a curved structure such as a coronary artery structure. It is also time consuming for an operator to select appropriate plane orientations and thickness to adequately view a segment of coronary artery structure, and the manual nature of the procedure can produce variations between images.

The second method is a curved MPR method, which uses curved plane reconstruction. The centreline path of a vessel, in this case a segment of coronary artery, is calculated along its entire length and then viewed (rendered) as a single extruded plane with the associated perpendicular axial cross sections of the curve at any selected point along its length being displayed.

Curved MPR can provide a good overview of the entire vessel in a single planar view, but curved MPR images are generally not as trusted by users as planar images are. Furthermore, it is still necessary for the user to select slab thicknesses and other parameters when using curved MPR. The selection of such parameters and the selection and viewing of cross-sectional images along at a series of manually selected points along the vessel are time consuming.

Coronary vessels are inherently curved structures, which change planar orientation significantly along their course and provide significant challenges to users in obtaining and interpreting two dimensional images of the structures from three dimensional data sets using CT, MR or cone-beam catheter based angiography methods. The time taken to obtain and interpret two dimensional images using either the traditional or modern methods described above can be significantly greater than the time needed to interpret images obtained using traditional catheter-based angiography techniques. Furthermore, curved MPR techniques are at present not trusted by some practitioners.

BRIEF DESCRIPTION OF THE DRAWINGS

Embodiments are now described, by way of non-limiting example, and are illustrated in the following figures, in which:—

FIG. 3 is an illustration of a portion of a coronary artery;

FIG. 4 is an illustration of a polyline representative of a centreline of a segment of coronary artery;

FIGS. 5 to 7 are further illustrations of the polyline of FIG. 4, and also show an MPR plane;

DETAILED DESCRIPTION

According to one embodiment, a method of generating an image of a segment of a lumen structure, comprises acquiring volumetric image data that comprises image data representative of a segment of a lumen structure, extracting the segment of lumen structure from the volumetric image, and calculating a thickness of planar MPR slab that at least encompasses the longitudinal segment of lumen structure. The method may further comprise rendering a planar MPR slab image based on the thickness and the volumetric image data.

Figure 1:
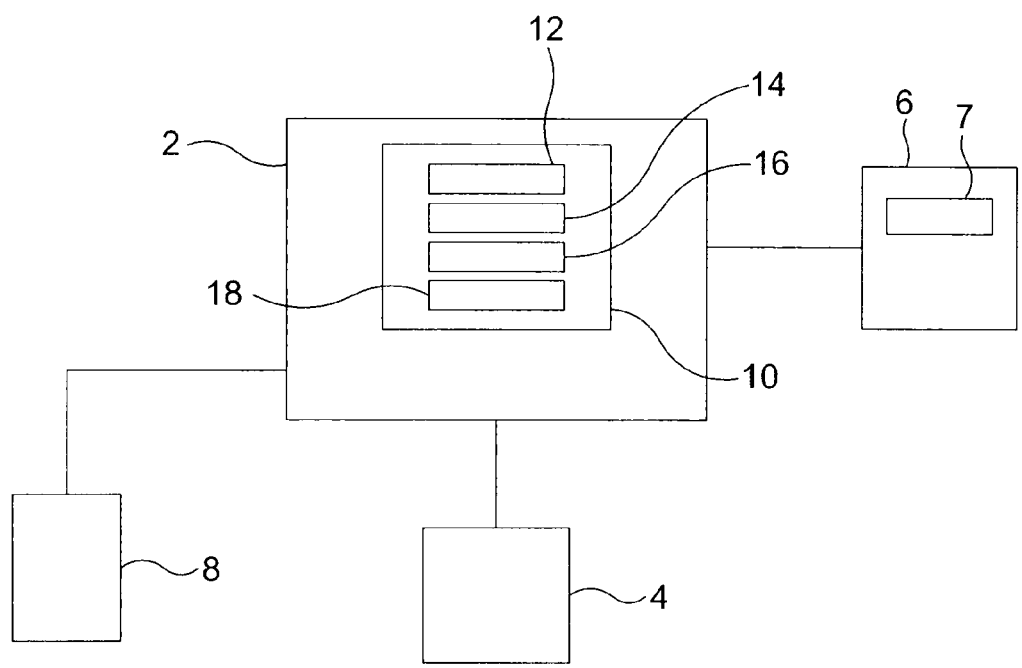
FIG. 1 is a schematic diagram showing an imaging apparatus according to an embodiment.

An image processing apparatus according to an embodiment is illustrated schematically in FIG. 1. The apparatus comprises a processing apparatus 2, in this case a personal computer (PC) or workstation that is connected to a display device 4, a data store 6 and a user input device or devices 8, in this case a computer keyboard and mouse.

The processing apparatus 2 comprises a central processing unit (CPU) 10 that is operable to load and execute a variety of software modules or other software components. In the embodiment of FIG. 1, the software modules include a rendering and display module 12 for rendering and outputting processed image data for display on the display device 4. The software modules also include a user input and control module 14 for processing user input obtained via the user input devices 8, and for providing selection, execution and control of various automated image processing routines provided by the apparatus. A segment selection, extraction and path tracking module 16, and an MPR fitting module 18 are also provided, and the processes performed by those modules are described in more detail below.

The processing apparatus 2 includes other standard components of a PC including RAM, ROM, a data bus, an operating system including various device drivers, and hardware devices (for example a graphics card) for interfacing with various peripheral devices. Such standard components are not shown in FIG. 2 for clarity.

The data store 6 in the embodiment of FIG. 1 stores a volumetric data set 7 representative of three dimensional CT data obtained from CT measurements of the coronary artery structure of a patient, and in operation the volumetric data set is downloaded from the server to the processing apparatus for processing. The data store 6 in the embodiment of FIG. 1 is a server that stores a large quantity of patient data, and may form part of a Picture Archiving and Communication System (PACS). In other embodiments, the volumetric data set representative of the three dimensional data set is stored in memory of the processing apparatus 2.

Figure 2:
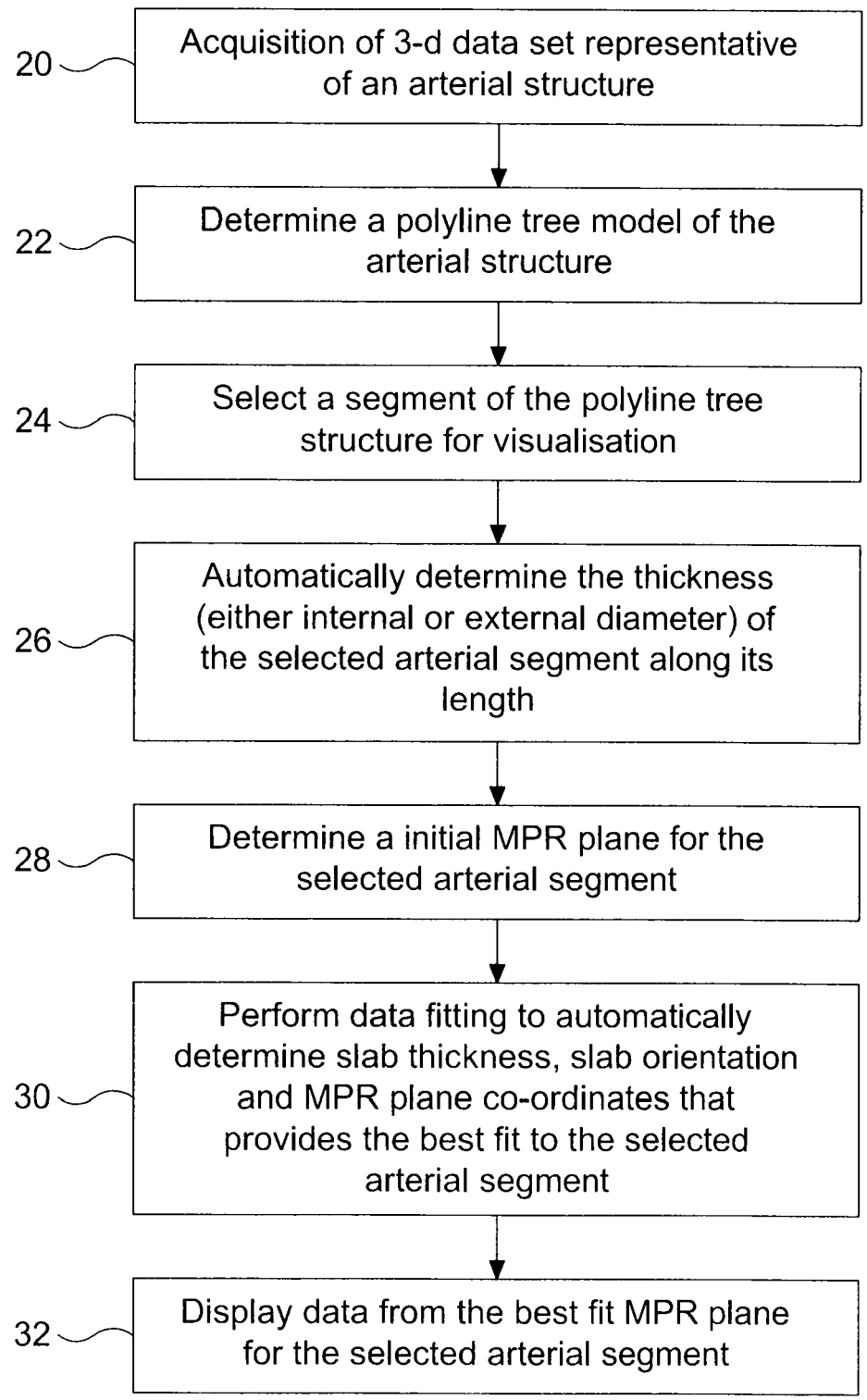
FIG. 2 is a flow chart representing an imaging method according to one embodiment.

The method performed by the processing apparatus 2 in operation is illustrated in overview in FIG. 2. In the first stage 20 of the method, the volumetric data set 7 representative of three dimensional CT data obtained from CT measurements of the coronary artery structure of a patient is retrieved by the processing apparatus 2 from the data store 6. In alternative embodiments, the volumetric data set is obtained directly from a CT scanner apparatus as the CT measurements are performed. In some such alternative embodiments the processing apparatus 2 forms part of the CT scanner and is also configured to control operation of the CT scanner.

In the next stage 22 of the method, an initial selection of data relating to the coronary artery structure is performed and then the selected data is processed to generate a polyline tree model of the coronary artery structure. The selected data is initially segmented so that each segment of data represents a segment of the coronary artery structure. The initial segmentation can be performed manually, by an operator selecting segments of an image of the coronary artery structure displayed on the display device 2, or automatically.

The centreline path of each segment of coronary artery is then determined along its entire length. The centreline path of the vessel can be determined automatically, semi-automatically, or manually, using any of a variety of known techniques. For example, the centreline paths can be determined and a polyline tree generated using the Voxar 3D VesselMetrix software package produced by Toshiba Medical Visualisation Systems.

An overview of known techniques for determining the centreline of the vessel is described in Medical Image Analysis, 13 (2009) 701-714. In manual techniques an operator selects various points along the path of the vessel. In semi-automatic techniques, the operator can select start and end points for the vessel to be tracked, and a tracking algorithm determines the track of the vessel. The centreline path of the vessel is represented by a polyline, and the coronary artery structure as a whole is represented as polyline tree model comprising a plurality of connected polylines. Each polyline comprises a set of points in three dimensional space, each point representing a point along the centreline of the vessel.

Each polyline may be labelled either automatically or manually, for example labelled according to a standard coronary artery structure model such as the AHA 15 segment model, described in Circulation, Vol. 51, January-June 1975, AHA Committee Report, "A Reporting System on Patients Evaluated for Coronary Artery Disease" or the modified AHA 17 segment model, which divides the coronary artery tree at selected points along its length into longitudinal segments. The labelling may be performed using methods described in co-pending U.S. patent application Ser. No. 12/236,789, the contents of which are hereby incorporated by reference.

In the next stage 24 of the method, a segment of the polyline tree is selected to be fitted using the MPR fitting procedure provided by the processing apparatus 2. In one mode of operation a representation of the polyline line tree model is displayed on the display device and the segment for fitting is selected manually by an operator using the keyboard or mouse.

In the next stage 26 of the method, the thickness of the selected arterial segment is determined for a series of points along its length, and the thicknesses are stored by the processing apparatus 2. The thicknesses may be determined from the inner or outer surface of the selected arterial segment. The thicknesses are usually determined in two mutually orthogonal directions through a cross-section of the selected arterial segment.

Any suitable known automatic, semi-automatic or manual technique for determining the thicknesses of the arterial segment can be used. In the method illustrated in FIG. 2, a series of slices through the volumetric data set in a direction perpendicular to the arterial segment at a series of points along the length of the arterial segment are extracted automatically from the volumetric data set. The diameter of either the inner or outer contour of the segment (lumen or the outer wall of the arterial vessel) is determined automatically in two orthogonal directions for each slice. An example of a section of coronary artery that includes a lumen 34 and outer walls of significant thickness 36, 38 is shown schematically in FIG. 3.

At the next stage 28, an MPR plane is selected from a library of MPR planes stored in memory at the processing apparatus, the selected MPR plane corresponding to the arterial segment under consideration. Each MPR plane in the library has an orientation that corresponds to a corresponding standard view plane used in catheter-based angiography. Thus each MPR plane represents the orientation of an X-ray source and detector that would be typically be used to perform a catheter-based angiography measurement on the selected arterial segment using a C-arm X ray imaging apparatus. Each MPR plane can be considered to be an MPR slab having zero thickness. In alternative embodiments, MPR slabs having non-zero thickness are stored in and selected from the library.

FIG. 4 is an illustration of a polyline representative of a vessel centreline 40 automatically determined at stage 22 of the method for a selected arterial segment. In this case the selected segment is the left anterior descending (LAD) segment of the coronary artery tree. The polyline is obtained from a set of polyline co-ordinates, each representative of a point on the vessel centreline which is then transformed into a curved plane. The vessel centreline follows a path through three dimensional space, which can be plotted using a sagittal, coronal and axial co-ordinate system shown schematically in FIG. 4.

The vessel centreline 40 of the LAD segment illustrated in FIG. 4 is also shown in FIG. 5, in which the solid circles represent the selected points on the vessel centreline 40 from which the polyline is calculated. FIG. 5 also shows the MPR plane 42 selected from the library for the LAD segment, which corresponds to a view plane that could be used for a catheter-based angiography measurement on such an LAD segment. The MPR plane 42 has an orientation of 30° left anterior oblique (LAO) and 30° cranial.

Other standard view planes or standard cardiac catheter projection angles for different cardiac artery structures, which could be used as an input to obtain the optimal view for a given coronary artery structure include, for example, 30°-60° LAO; LAO & RAO; 30° LAO, 20° cranial; 20° LAO; 30° LAO, 20°-30° cranial; 20° RAO, 0°-15° caudal; 30° LAO, 30° cranial; 30° RAO, 15° caudal; 30° RAO, 15° cranial; 30°; 30° RAO, 15°-20° caudal. Examples of standard view planes are mentioned, for example, in "Coronary Anatomy, Variants and Lesion Characteristics", Vetrovec, January 2003, The Society for Cardiovascular Angiography and Interventions (http://www.scai.org/Education/Slides.aspx).

FIG. 6 again shows the centreline 40 of the vessel, the solid circles representing the selected points on the vessel centreline 40 from which the polyline is calculated, and the selected MPR plane 42. The boundary of the lumen of the selected arterial segment is also shown by curved dashed lines 44, 46.

Figure 6:
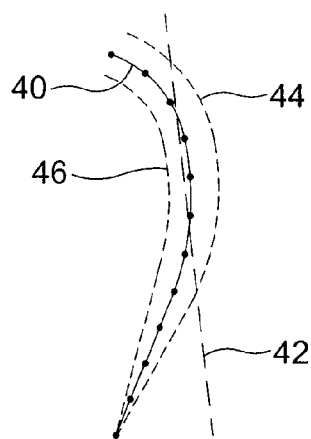

The selected MPR plane shown in FIGS. 5 and 6 has zero thickness, and it can be seen from those figures that the selected MPR plane 42 intersects the curved centreline of the LAD arterial segment at only two points, and that for a significant part of the length of the arterial segment the selected MPR plane is outside the lumen of the arterial segment. If an image of the LAD arterial segment were to be generated for the selected MPR plane having zero thickness then very little information concerning the arterial segment would be obtainable from the image as much of the segment is distant from the selected MPR plane and would not be viewable in the image.

In the next stage 30 of the method, the MPR plane is thickened to form a thickened MPR slab, and a data fitting procedure is performed to obtain the optimum MPR slab orientation and thickness. The fitting procedure is performed based on the set of polyline co-ordinates (represented by the solid circles in FIG. 5), the respective thickness of the arterial segment at each polyline co-ordinate, the orientation of the MPR plane, and the thickness of the MPR slab. As the fitting is based upon a set of discrete centreline co-ordinate points it is not affected by any inaccuracy in interpolation methods that might be used to join those points to provide a continuous centreline between the points.

Figure 7:
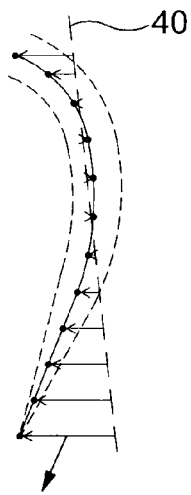

In the embodiment of FIG. 1, the fitting is a least squares fitting, in which firstly the sum of squared distances between points at equally spaced points along the centreline of the vessel and their orthogonal projection onto the MPR plane is minimised by varying the position and orientation of the MPR plane. The resulting optimised MPR visualisation plane is achieved when the sum of the squared distances is as close to zero as possible, or at least within a predetermined acceptable limit. The distances between the centreline points and their projection onto the MPR plane is illustrated schematically by arrows in FIG. 7.

In the next stage of the fitting, the required thickness of the MPR slab is determined. The required thickness of the MPR slab is determined as being the maximum distance between the optimum MPR plane determined in the first stage of the fitting and the boundary 44, 46 of the lumen of the arterial segment (or the outer wall of the arterial segment) in three dimensional space. Thus it can be ensured that the resulting MPR slab encompasses the lumen of the arterial segment over the whole of its length.

In the measurements illustrated in FIGS. 4 to 7, the fitting procedure produces an optimised MPR slab having a thickness of 10 mm and an orientation of 32° left anterior oblique (LAO) and 35° cranial (in comparison to the orientations of 30° left anterior oblique (LAO) and 30° cranial for the initial MPR plane read from the library).

In a variant of the fitting procedure described in the preceding three paragraphs, both the position and orientation of the MPR slab plane and the thickness of the MPR slab are fitted simultaneously. In that variant, the position, orientation and thickness are varied to find an MPR slab that encompasses the lumen (or outer walls) of the arterial segment over substantially the whole of its length, subject to the constraint that the thickness of the MPR slab is minimised.

In a further variant of the fitting procedure the fitting is subject to a further constraint that the position and orientation of the MPR plane do not vary by more than a predetermined amount, for example 5% or 10% or 20%, from the position and orientation of the MPR plane read from the library. That can ensure that the image viewed by a radiologist, cardiologist or other user matches well the type of image that might be obtained using a catheter based angiography method.

At the next stage 32 of the method, volumetric data from the best fit MPR slab, or MPR slabs orthogonal to the fitted MPR slab if desired, is displayed on the display, and shows the selected segment of the coronary artery along its entire length. Cross-sectional slices through the arterial segments at points selected by the operator are also displayed using known techniques.

The method of the embodiment of FIG. 2 can significantly reduce the time take for an optimal oblique MPR view of a segment of a coronary artery to be obtained, by automatically calculating optimal display settings for reading individual coronary arteries in a standardised fashion. The method used the underlying curve model of the curve structure to orient and present the optimal MPR plane and MPR slab thickness for a selected segment, but uses planar MPR as the method of displaying the results to a user, therefore increasing confidence for the user at the same time as providing a viewing plane that is optimised for the anatomy of a particular patient.

Furthermore, although the method takes as a starting point standard viewing planes for a particular vessel it alters the orientations of those viewing planes automatically to provide the optimised MPR slab for viewing a particular patient's anatomy, and provides for display of image data that is tailored for a particular patient's anatomy.

By using the MPR plane read from the library, and corresponding to standard cardiac catheter projection angles previously used in clinical practice, as a starting point for the fitting procedure in the embodiment of FIG. 1, it is found that an acceptable fit can be obtained rapidly. Furthermore, it has been found that the resulting images displayed on the display correspond well to the type of images obtained using catheter based cardiac angiography techniques that radiologists or cardiologists are used to viewing, although the images displayed on the display are optimised for a particular patient's anatomy unlike catheter based cardiac angiography measurements which are usually based upon an average patient's anatomy.

In an alternative mode of operation to that illustrated in FIG. 2, the determination of the polyline tree model, the selection of an arterial segment for fitting, and the determination of the thickness (either internal or external diameter) of the selected arterial segment are performed in advance, and provided to the processing apparatus 2. In that alternative mode of operation, the data downloaded by the data store comprises a pre-calculated and optionally labelled polyline model of one or more segments of the coronary artery tree based on the centrelines of the arteries, diameter data representative of the diameter of the segment or segments, and optionally a vessel label identifying the arterial segment or segments to be fitted. The method performed by the processing apparatus then begins at stage 28 with the selection of an initial MPR plane for the selected arterial segment.

The method described above in relation to FIG. 2 describes the fitting of a single MPR slab to a coronary artery segment. In alternative embodiments a coronary artery segment is divided into two or more different sections, and each section is fitted to a respective, different MPR slab. In some such embodiments, the user selects whether the coronary artery segment is to be fitted to a single MPR slab or to multiple MPR slabs. Optionally the user can also select the position of the boundary between the sections of the coronary artery segment. In another embodiment the processing apparatus automatically determines that the coronary artery segment is to be divided into two (or more) in response to the quality of the fit to a single MPR slab or plane being outside a predetermined threshold or range.

For example, in certain embodiments it is determined automatically to fit the coronary artery segment to two separate MPR slabs if a fit to a single MPR slab over the whole length of the segment provides an MPR slab thickness that is greater than a pre-determined threshold thickness. It may also be determined automatically to fit the coronary artery segment to two separate MPR slabs if the fit to a single MPR slab produces a fitted MPR plane that has an average or maximum distance to the coronary artery centreline that is greater than a predetermined threshold amount.

Figure 8:
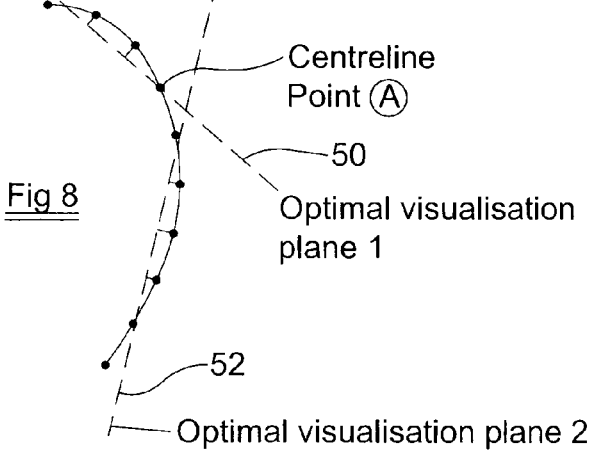
FIGS. 8 to 10 are illustrations of the polyline representative of a centreline of the segment of coronary artery, fitted to two MPR planes or slabs.

An embodiment in which two MPR planes (MPR slabs having zero thickness) are fitted to different sections of a coronary artery segment is illustrated in FIG. 8. The coronary artery segment is the same segment, for the same patient, as shown in FIGS. 4 to 7. In this case, two MPR planes have been fitted to the centreline points, a first MPR plane 50 fitted to a first section of the centreline at one side of point A shown in the figure, and a second MPR plane 52 fitted to a second section of the centreline at the other side of point A. The fitting of each MPR slab to a respective section of the coronary artery segment is performed as described above in relation to FIGS. 4 to 8.

Figure 9:
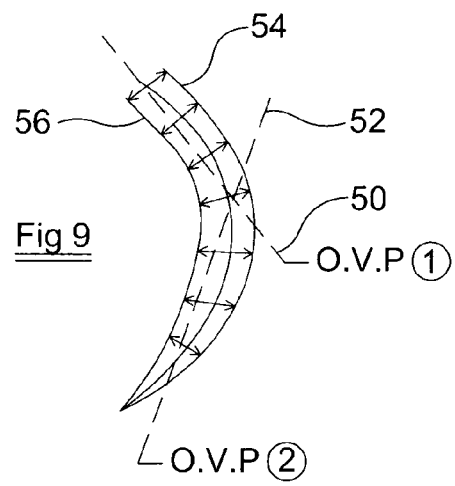
Figure 10:
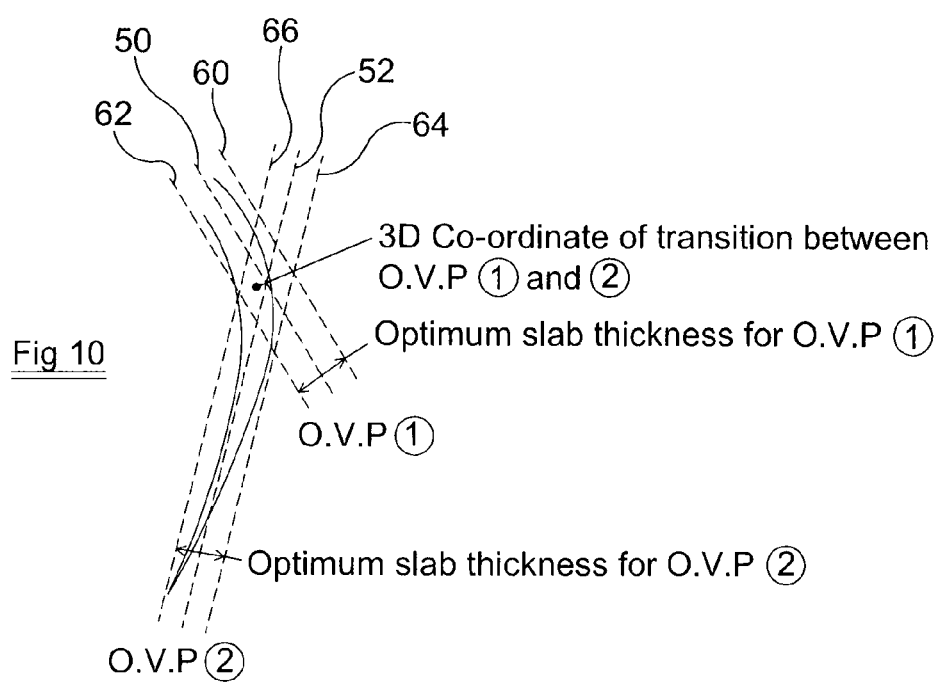

It can be seen from FIG. 8 that the optimised MPR planes 50, 52 having zero thickness do not intersect with all of the centreline points. The MPR planes 50, 52 are again thickened to form thickened MPR slabs based on the diameter of the lumen of the arterial segment. FIG. 9 shows the walls 54, 56 of the lumen of the arterial segment. Each MPR slab 50, 52 is thickened to a thickness equal to the maximum distance, perpendicular to the MPR slab, between the MPR slab and the walls of the lumen in three dimensional space. In the example shown in FIG. 9, the maximum distance is 5 mm. The resulting MPR slabs are shown in FIG. 10, with the boundaries of each of the MPR slabs being indicated by dashed lines 60, 62 and 64, 66. The point 68 in three dimensional space at which there is a transition between the first MPR slab and the second MPR slab is also indicated.

The thickness of both MPR slabs can be set to be the same, or the thickness of each MPR slab can be fitted independently of the other. Any suitable fitting procedure can be used to fit the multiple MPR slabs. As mentioned above in relation to the fitting of a single MPR slab, the location and orientation of the MPR planes and the thickness of the MPR slabs can be fitted simultaneously or separately in alternative embodiments. In the case of the multiple MPR planes, the location of the transition point 68 between a first MPR slab and a second MPR slab can also be varied as part of the automatic fitting procedure, if desired.

Figure 11:
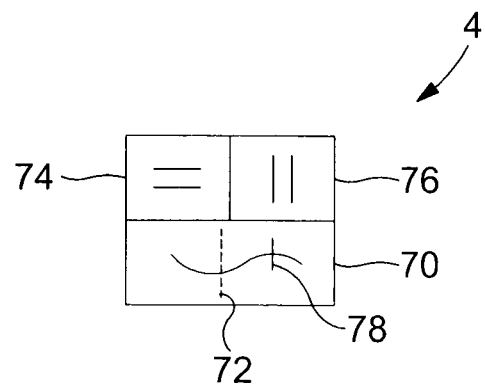
FIG. 11 is an illustration of a display for displaying images of the coronary artery segment.

An example of the display of images of a segment of a coronary artery structure obtained according to the embodiment of FIGS. 8 to 10 and displayed on the display device 4 is illustrated schematically in FIG. 11.

Images are displayed in three windows on the display device 4. In the first window 70 an image of the entire length of the segment of coronary artery in a view direction obtained by suitable rendering of the volumetric image data based on the first and second MPR slabs shown in FIG. 10 is displayed. Both first and second sections of the segment are displayed, and the view direction for each section is perpendicular to the face of the fitted MPR slab for that section.

At a point indicated by dashed line 72, which corresponds to the point 68 in three-dimensional space shown in FIG. 10, the viewing plane changes orientation automatically, as there is a transition from use of the first MPR slab to the second MPR slab. The change in viewing plane within a single image provides a double oblique view that means that the whole of the segment can be viewed by the user simultaneously, whilst still providing for planar views of the segment.

In the second and third windows 74, 76, slices of the volumetric image data in directions orthogonal to the view direction are displayed. The slices are obtained from a selected location 78 along the length of the segment of coronary artery, which is indicated by a solid line in FIG. 11. The operator can select the location 78 at which the slices are obtained by operator of a mouse and mouse pointer in the first window 70. The embodiment of FIGS. 8 to 11 can automatically provide for rapid imaging of coronary artery structures using imaging planes that are tailored to a particular patient's anatomy, and provide views to a radiologist, cardiologist or other user that may be of similar form to those previously obtained using catheter based coronary angiography.

Figure 12A:
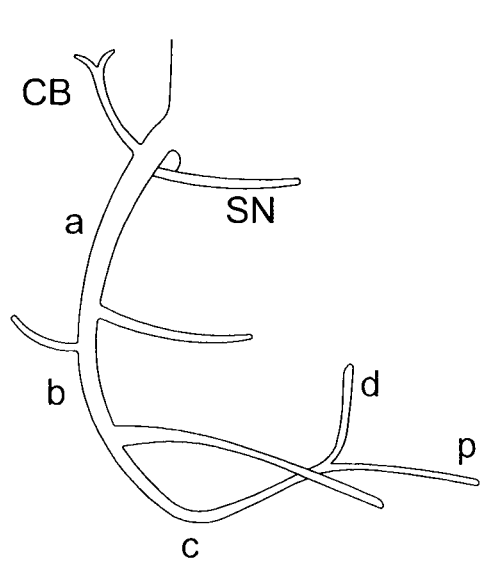
FIGS. 12a and 12b are diagrams of a coronary tree structure.
Figure 12B:
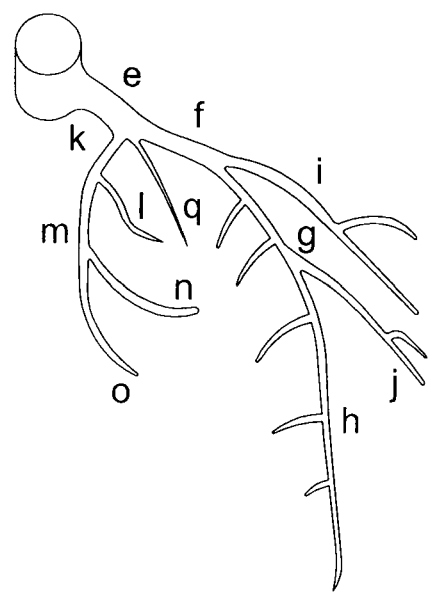

The embodiments described above in relation to FIGS. 4 to 10 have been described in relation to the imaging of the left anterior descending (LAD) segment of the patient's coronary artery structure, classified according to the modified AHA 17 segment model. An illustration of the coronary structure according to that model is illustrated schematically in FIGS. 12a and 12b, and provides the segments listed in table 1. Any one of the segments identified in the AHA 15 segment model or the modified AHA 17 segment model may be imaged using the described embodiments. Alternatively, the coronary artery structure may be segmented in any other way desired by a user, and each segment may be imaged using the described embodiments.

TABLE 1

| Segment | Anatomical Description |
|---|---|
| A | Proximal Segment of Right Coronary before $1^{st}$ Acute Marginal branch |
| B | Middle Segment of Right Coronary between $1^{st}$ and $2^{nd}$ Acute Marginal branches |
| C | Distal Segment of Right Coronary before Postero-lateral branch |
| D | Right Posterior Descending Artery |
| E | Left Main (LM) artery |
| F | Proximal Left Anterior Descending artery before $1^{st}$ Diagonal branch |
| G | Middle Left Anterior Descending artery between $1^{st}$ and $2^{nd}$ Diagonal branches |
| H | Distal Left Anterior Descending artery after $2^{nd}$ Diagonal |
| I | $1^{st}$ Left Diagonal Branch |
| J | $2^{nd}$ Left Diagonal Branch |
| K | Proximal Left Circumflex artery before 1st Obtuse Marginal branch |
| L | $1^{st}$ Obtuse Marginal branch |
| M | Middle Left Circumflex artery between $1^{st}$ and $2^{nd}$ Obtuse Marginal branches |
| N | $2^{nd}$ Obtuse Marginal branch |
| O | Distal Left Circumflex artery after $2^{nd}$ Obtuse Marginal branch |
| P | Right Postero-lateral branch |
| Q | Ramus-Intermedius branch |

The embodiment of FIG. 1 can provide for the individual calculation of the optimized visualization plane of a curved structure represented by data contained within a volumetric medical imaging dataset. In order to achieve an optimum visualization plane for the curved structure (for example a blood vessel) information about the path of the vessel in three dimensional space and the diameter of the vessel can be used to determine a best fit plane orientation and thickness.

Use of CT or MRI scanners for a imaging of coronary artery structures can provide an alternative to the use of traditional catheter-based coronary angiography. However, it may be desired also to perform subsequently a further procedure, or further imaging, using a further imaging apparatus, for example a C-arm X-ray apparatus.

Figure 13:
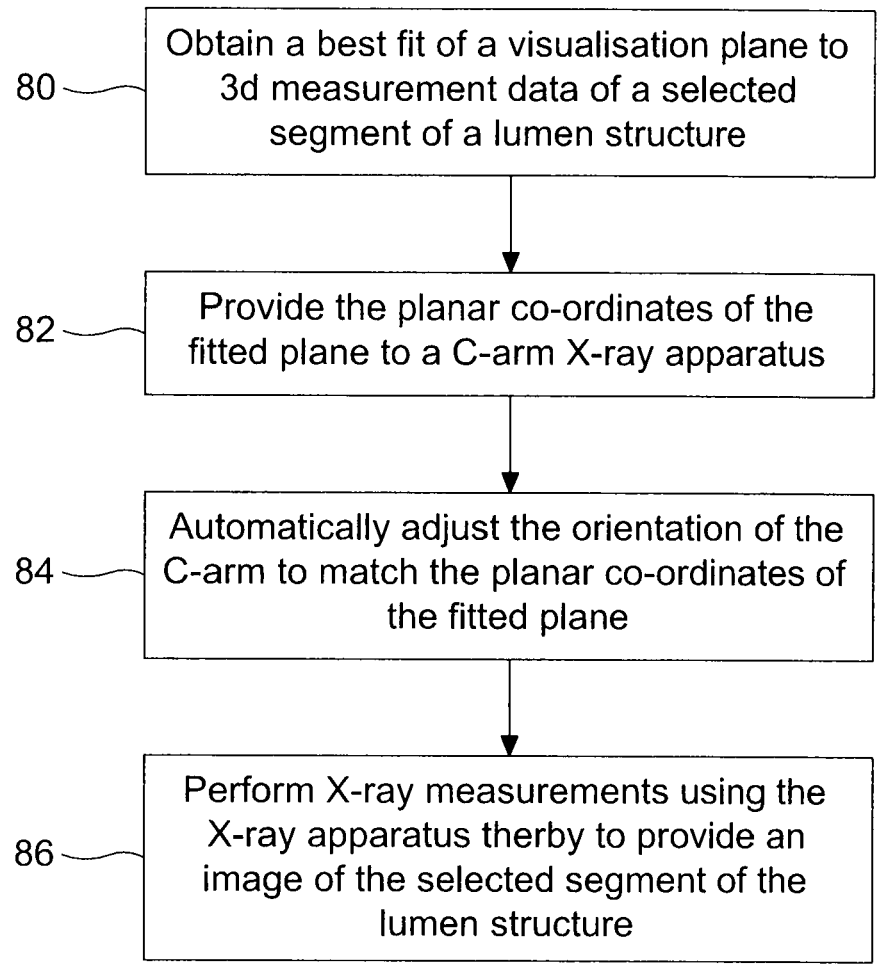
FIG. 13 is a flow chart representing an imaging method according to a further embodiment.
Figure 14:
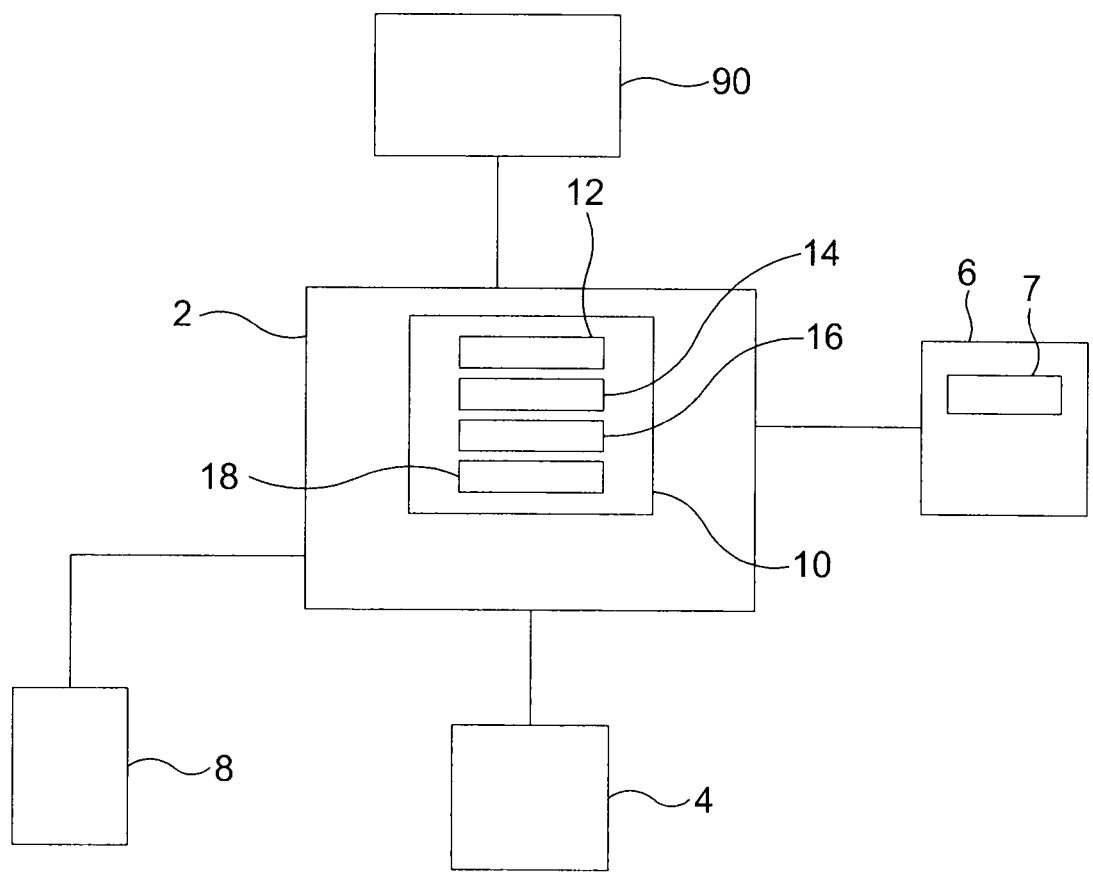
FIG. 14 is a schematic diagram showing an imaging apparatus according to a further embodiment.

In a further embodiment, the optimal MPR plane or slab obtained by the processing apparatus 2, for example as described in relation to any of FIGS. 4 to 12, is used to set measurement parameters for measurements by a C-arm X-ray apparatus or other imaging apparatus. A method performed by such an embodiment is illustrated in overview in the flowchart of FIG. 13. In the further embodiment the processing apparatus 2 is connected to the C-arm X-ray apparatus 90 via suitable cabling as shown schematically in FIG. 14, enabling the transmission of data and control signals between the processing apparatus and the C-arm X-ray apparatus.

In the first stage 80 of the method a best fit of an image plane to three dimensional measurement data of a selected segment of a lumen structure is obtained. The visualisation plane may be an optimised MPR plane or slab obtained according to embodiments described in relation to any of FIGS. 2 to 11. In the next stage 82 of the procedure, planar co-ordinates of the fitted visualisation plane are provided to a C-arm X-ray apparatus, for example by the processing apparatus 2.

At the next stage 84, the C-arm X-ray apparatus automatically adjusts the orientation of the X-ray source and detector to match the planar co-ordinates of the fitted plane. At the final stage 86 the C-arm X-ray apparatus performs X-ray measurements thereby to provide an image of the selected segment of the lumen structure.

The data provided to the C-arm X-ray apparatus may differ in different embodiments, depending on the form of data input that is compatible with the particular C-arm X-ray apparatus that is being used. For example, the processing apparatus 2 may provide the C-arm X-ray apparatus directly with desired angles of orientation of the C-arm that correspond to the orientation of the fitted MPR plane.

In a further embodiment, the C-arm X-ray imaging apparatus 90 is again used to obtain X-ray image data, in this case X-ray fluoroscopic image data, of a subject, for example a patient. The X-ray fluoroscopic image data is sent in real time from the imaging apparatus 90 to the processing apparatus 2, together with measurement data representative of measurement parameters used to obtain the image data. The measurement data includes orientation data representative of the orientation of the C-arm X-ray imaging apparatus.

The processing apparatus 2 processes the X-ray fluoroscopic image data and renders and outputs X-ray fluoroscopic images via the display device 4. The processing apparatus also processes volumetric image data, for example CT image data, that has been obtained on the same subject and displays a slab MPR image of the subject on the display device. The slab MPR image is displayed on the display device 4 simultaneously with the X-ray fluoroscopic images. The slab MPR image may be an image of a selected segment of a lumen structure, for example a coronary artery segment, and the X-ray fluoroscopic image may be an image of a region of the subject that includes the selected segment.

It is a feature of the embodiment that the processing apparatus 2 uses the measurement data representative of the orientation of the C-arm X-ray apparatus to select an orientation of the slab MPR image so that it matches the orientation of the displayed X-ray fluoroscopic image. If the orientation of C-arm imaging apparatus with respect to the subject changes then the processing apparatus receives updated orientation measurement data and changes the orientation of the slab MPR image accordingly. Thus, the display device 4 displays both an X-ray fluoroscopic image and an MPR slab image simultaneously, and the orientation of the MPR slab image is changed with the orientation of the fluoroscopic image in real time.

The MPR slab image may be produced from volumetric image data, for example CT image data, that has been previously obtained from measurements on the subject and stored. Alternatively, the apparatus 90 can be a combined C-arm X-ray imaging apparatus and CT imaging apparatus, and the volumetric image data and the fluoroscopic X-ray image data can be obtained from the subject simultaneously.

Although embodiments described in relation to FIGS. 1 to 14 have concerned the imaging of segments of a coronary artery structure, in alternative embodiments the described imaging methods are used for imaging of any suitable lumen structure in a human or animal body, for example the colon or segments of the colon, airways, ducts, for example pancreatic and common bile ducts, or a ureter.

Furthermore, whilst particular data fitting procedures using least squares fitting have been described in relation to particular embodiments any suitable data fitting procedures can be used in alternative embodiments. In addition, whilst particular modules have been described herein, in alternative embodiments functionality of one or more of those modules can be provided by a single module, or functionality provided by a single module can be provided by two or more modules in combination. It will also be well understood by persons of ordinary skill in the art that whilst embodiments implement certain functionality by means of software, that functionality could be implemented solely in hardware (for example by means of one or more ASICs (application specific integrated circuit)) or by a mix of hardware and software. As such, embodiments are not limited only to being implemented in software.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms and modifications as would fall within the scope of the invention.

The invention claimed is:

1. A method of generating an image of a segment of a lumen structure, comprising:
   acquiring volumetric image data that comprises image data representative of a longitudinal segment of the lumen structure;
   extracting the segment of lumen structure from the volumetric image data;
   obtaining a centerline of the segment of the lumen structure;
   obtaining a planar Multi-Planar Reconstruction (MPR) slab that extends longitudinally in a straight line;
   performing, by a processor or specialized hardware, an automatic fitting procedure that includes automatically varying a thickness of the planar MPR slab and an orientation of the planar MPR slab to obtain a fitted planar MPR slab that extends longitudinally in a straight line and that encompasses at least the centerline of the longitudinal segment of the lumen structure over a whole length of the segment of the lumen structure; and
   rendering an image from image data of the fitted planar MPR slab.

2. A method according to claim 1, further comprising selecting standard view plane data from a library of standard view plane data.

3. A method according to claim 2, wherein the standard view plane data is representative of a standard view plane used for catheter-based angiography measurements of a coronary artery segment.

4. A method according to claim 2, wherein the method comprises providing at least one limit for variation of orientation of the standard view plane, and the method comprises constraining the orientation of the planar MPR slab to be within said at least one limit.

5. A method according to claim 1, wherein the performing step is subject to a constraint that the planar MPR slab encompasses the segment of the lumen structure over the whole length of the segment.

6. A method according to claim 1, further comprising minimizing the thickness of the MPR slab subject to a constraint that the MPR slab encompasses the segment of the lumen structure.

7. A method according to claim 1, further comprising fitting the orientation of the planar MPR slab to the centerline of the segment of lumen structure.

8. A method according to claim 1, wherein the performing step comprises minimizing distance between a boundary of the segment of the lumen structure and a boundary of the planar MPR slab.

9. A method according to claim 1, wherein the performing comprises performing a least squares fitting procedure.

10. A method according to claim 1, further comprising obtaining at least one slice of image data in at least one direction orthogonal to the MPR slab and rendering the at least one slice of image data to provide at least one cross-sectional view of the segment of the lumen structure.

11. A method according to claim 1, wherein the lumen structure comprises one of a colon structure, an airway, a duct and a ureter.

12. A method according to claim 1, wherein the volumetric image data comprises at least one of computed tomography (CT) data, magnetic resonance (MR) data, or cone-beam catheter based angiography data.

13. A method according to claim 1, further comprising determining the thickness of the segment of the lumen structure, and fitting the MPR slab to the image data such that the MPR slab encompasses the lumen structure over the whole of its thickness.

14. A method according to claim 13, wherein the thickness of the segment of the lumen structure is determined from one of: inner walls of the segment of the lumen structure and outer walls of the segment of the lumen structure.

15. A method according to claim 1, further comprising fitting each of a plurality of longitudinal segments of the lumen structure to a respective, different MPR slab.

16. A method according to claim 15, further comprising rendering image data from each of the fitted MPR slabs to display images of each of the segments of the lumen structure simultaneously, each simultaneously displayed image having a respective, different view plane orientation.

17. A method according to claim 1, wherein the lumen structure comprises a coronary artery structure.

18. A method according to claim 17, wherein the segment of the coronary artery structure comprises a selected segment of the coronary artery structure that matches an American Heart Association classification.

19. A method according to Claim 1, further comprising deriving control data from the orientation of the planar MPR slab, the control data being for control of the orientation of an imaging apparatus to provide an image in substantially the same view plane as that represented by the optimized MPR slab.

20. A method according to claim 19, wherein the imaging apparatus comprises a C-arm X-ray apparatus, and the control data is for controlling orientation of the C-arm.

21. An apparatus for generating an image of a segment of a lumen structure, comprising:
    an acquisition module for acquiring volumetric image data that comprises image data representative of a longitudinal segment of the lumen structure;
    an extraction module for extracting the segment of the lumen structure from the volumetric image data;
    a calculation module for obtaining a planar Multi-Planar Reconstruction (MPR) slab that extends longitudinally in a straight line, obtaining a centerline of the segment of the lumen structure, and performing an automatic fitting procedure that comprises automatically varying a thickness of the planar MPR slab and an orientation of the planar MPR slab to obtain a fitted planar MPR slab that extends longitudinally in a straight line and that encompasses at least the centerline of the longitudinal segment of the lumen structure over the whole length of the segment of the lumen structure; and
    a rendering module for rendering an image from image data of the fitted planar MPR slab.

22. A non-transitory computer-readable medium comprising computer readable instructions that are executable by a computer to:
    acquire volumetric image data that comprises image data representative of a longitudinal segment of a lumen structure;
    extract the segment of the lumen structure from the volumetric image;
    obtain a centerline of the segment of lumen structure;
    obtain a planar Multi-Planar Reconstruction (MPR) slab that extends longitudinally in a straight line;
    perform an automatic fitting procedure that includes automatically varying a thickness of the planar MPR slab and an orientation of the planar MPR slab to obtain a fitted planar MPR slab that extends longitudinally in a straight line and that encompasses at least the centerline of the longitudinal segment of the lumen structure over the whole length of the segment of lumen structure; and
    render an image from image data of the fitted planar MPR slab.

* * * * *